United States Patent
Golov (10) Patent No.: US 11,524,690 B2
(45) Date of Patent: Dec. 13, 2022

(54) BLACK BOX OPERATIONS CONTROLLED BY DRIVER MENTAL STATE EVALUATION

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 16/783,371

(22) Filed: Feb. 6, 2020

(65) Prior Publication Data

US 2021/0245765 A1    Aug. 12, 2021

(51) Int. Cl.
| | | |
|---|---|---|
| G07C 5/08 | (2006.01) | |
| B60W 40/09 | (2012.01) | |
| G06K 9/62 | (2022.01) | |
| B60W 40/08 | (2012.01) | |

(52) U.S. Cl.
CPC .......... B60W 40/09 (2013.01); G06K 9/6267 (2013.01); G07C 5/0875 (2013.01); *B60W 2040/0818* (2013.01); *B60W 2040/0872* (2013.01); *B60W 2540/22* (2013.01); *B60W 2540/229* (2020.02)

(58) Field of Classification Search
CPC ............ B60W 40/09; B60W 2540/22; B60W 2040/0872; B60W 2540/229; B60W 2040/0818
USPC ...................................................... 701/33.4
See application file for complete search history.

(56) References Cited

U.S. PATENT DOCUMENTS

| | | | |
|---|---|---|---|
| 7,027,621 B1 | 4/2006 | Prokoski | |
| 8,725,311 B1 | 5/2014 | Breed | |
| 8,818,614 B1* | 8/2014 | Lekutai | G08B 25/12 |
| | | | 701/32.2 |
| 2008/0292146 A1 | 11/2008 | Breed et al. | |
| 2009/0091435 A1* | 4/2009 | Bolourchi | B60K 28/066 |
| | | | 340/575 |
| 2014/0210625 A1* | 7/2014 | Nemat-Nasser | G08B 21/06 |
| | | | 340/575 |
| 2016/0086285 A1 | 3/2016 | Jordan Peters et al. | |
| 2018/0050696 A1* | 2/2018 | Misu | A61B 5/7282 |
| 2018/0194365 A1* | 7/2018 | Bae | G06V 20/597 |
| 2018/0257659 A1* | 9/2018 | Nguyen | G07C 5/0816 |
| 2020/0122734 A1* | 4/2020 | Sim | B60W 30/143 |

FOREIGN PATENT DOCUMENTS

KR          101768847          8/2017

OTHER PUBLICATIONS

International Search Report and Written Opinion, PCT/US2021/016402, dated Apr. 27, 2021.

\* cited by examiner

*Primary Examiner* — Nadeem Odeh
(74) *Attorney, Agent, or Firm* — Greenberg Traurig (57) ABSTRACT

The disclosed embodiments are directed to adjusting the operational characteristics of a black box installed in a vehicle. In one embodiment a method is disclosed comprising classifying a mental state of a driver of an automobile, loading at least one setting based on the mental state, the setting defining an operational characteristic of a black box installed in the automobile, configuring the black box using the at least one setting, and recording one or more events by the black box.

15 Claims, 5 Drawing Sheets

BLACK BOX OPERATIONS CONTROLLED BY DRIVER MENTAL STATE EVALUATION

FIELD OF THE TECHNOLOGY

The disclosed embodiments are directed towards automotive systems and, in particular, to systems for adjusting the operations of vehicle electronic data recorder devices based on a user's synthesized mental state.

BACKGROUND

In the United States, vehicles are involved in approximately six million collisions each year. Many such vehicles are equipped with event data recorder (EDR) devices, also referred to as black boxes. These devices record data generated by the vehicle such as speed data, control data (e.g., use of turn signals), and other data. Generally, black boxes in automobiles only record a limited duration of data (e.g., a few minutes). In this scenario, the black box continuously overwrites data as time progresses. Such devices are statically configured and operated consistently regardless of the operation of the vehicle. Thus, current black boxes can frequently fail to capture significant data that occurs outside the device's recording "window."

While such a configuration may prove useful for identifying data occurring just before a collision, they fail to capture relevant data leading up to a collision. In addition to the foregoing, all automotive devices are constrained by space and power concerns. Thus, it is not practical to simply record all possible data while a vehicle is in motion. Such a naïve approach would require significant power and storage space, requirements that are not feasible in current automobiles.

The disclosed embodiments solve these and other technical problems by providing a contextual method for modifying the recording fidelity of a black box based on a synthesized mental state of a user.

BRIEF DESCRIPTION OF THE DRAWINGS

The embodiments are illustrated by way of example and not limitation in the figures of the accompanying drawings in which like references indicate similar elements.

DETAILED DESCRIPTION

The disclosed embodiments describe devices, methods, and computer-readable media for modifying the operation of a black box installed in an automobile. The method includes techniques for evaluating a user's mental state while operating a vehicle. Based on the detected mental state, the operational parameters of a black box are modified to adjust the recording properties of the black box to ensure enough data is collected when the user is in a non-alert state.

Figure 1:
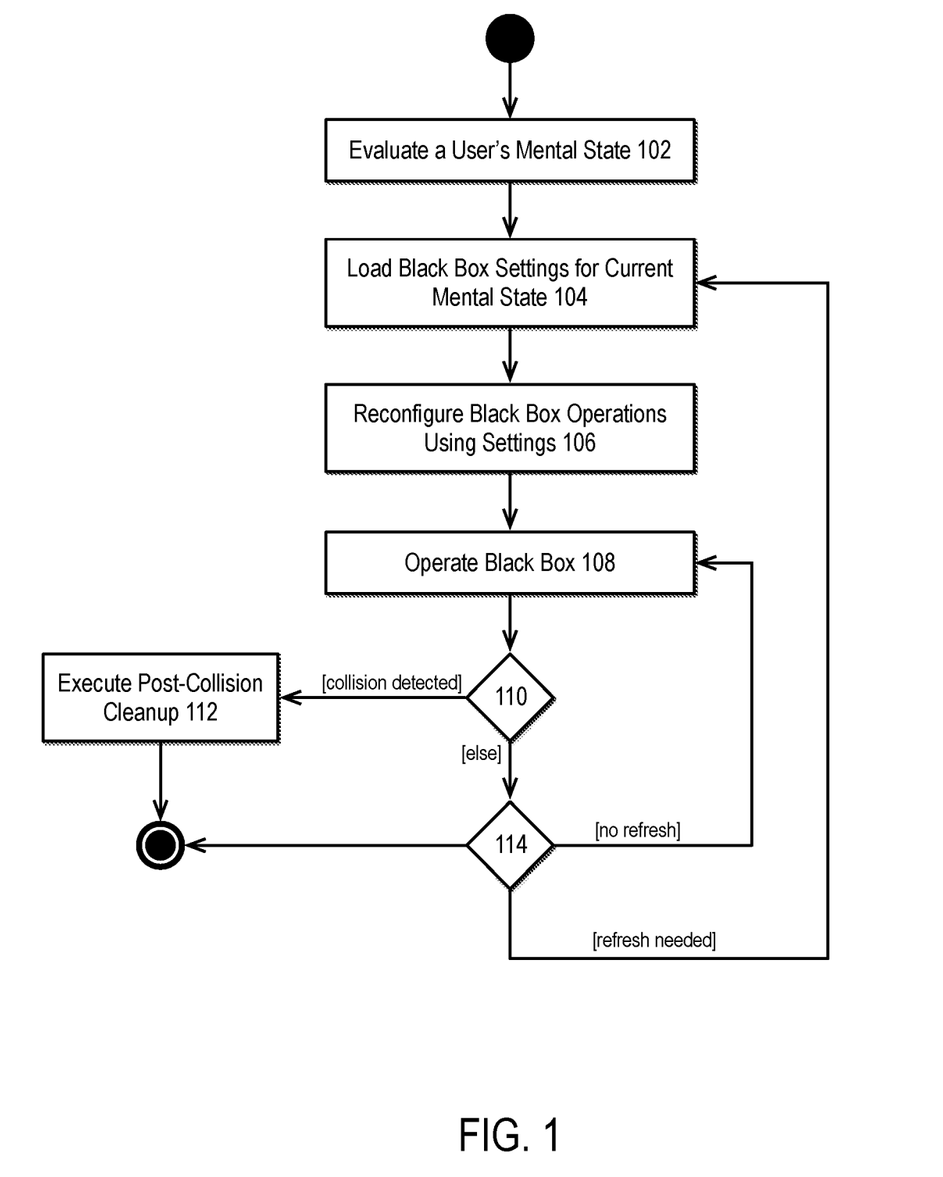
FIG. 1 is a flow diagram illustrating a method for controlling black box operations of a vehicle based on a user's mental state according to some embodiments of the disclosure.

FIG. 1 is a flow diagram illustrating a method for controlling black box operations of a vehicle based on a user's mental state according to some embodiments of the disclosure.

In block 102, the method evaluates a user's mental state. As used herein, a user's mental state refers to the characteristics of a user's driving at a given time. For example, three exemplary mental state are described herein: drowsy, tired, and impaired. In some embodiments, these three states describe increasingly dangerous driving states. For example, a user in a drowsy state may exhibit erratic speed patterns (e.g., slowing down followed by rapid acceleration). A user in a tired state may exhibit patterns indicating swerving of an automobile. A user in an impaired state may exhibit patterns such as failure to operate certain controls (e.g., turn signals) as well as increased swerving, potentially crossing dividing lines of a road.

In one embodiment, the method synthesizes a user's mental state based solely on the operating parameters of a vehicle. In most modern vehicles, various components (depicted in FIG. 5) output various messages containing parameters of the respective components. For example, an ECU of a vehicle may output current speeds of the vehicle over time. Similarly, other ECUs may output signals indicating a brake or gas pedal was depressed. In one embodiment, the method uses these outputs to synthesize a user's mental state. Further examples of this procedure are provided in FIGS. 2 and 3, and those details are not repeated herein.

Alternatively, or in conjunction with the foregoing, a user's mental state can be determined using specialized hardware. As one example, a vehicle can be equipped with a breathalyzer device. A user may be required to use this device prior to using a vehicle. The output of such a device may comprise a blood alcohol content (BAC) level value. In some embodiments, this BAC value may be used to set the mental state. In other embodiments, this value may be used as a factor in determining the user's mental state (e.g., combined with operational parameters). As another example, a user may be required to answer one or more questions or solve one or more puzzles prior to starting a vehicle. These questions or puzzles can be displayed on a center console display. In one embodiment, the time it takes a user to answer the question or puzzle may indicate their mental state. For example, a slow reaction time may indicate a tired or drowsy state and a failure to solve a simple puzzle may indicate an impaired state. The degree of slowness may be used to determine whether a user is drowsy (slightly slow) or tired (significantly slow). The slowness may be compared to an expected rate of solving or answering. As with the previous example, the measurement of slowness or completion may be combined with the analyzing of the operational parameters of the vehicle.

In some embodiments, the output of block 102 comprises a continuous value. In this scenario, the value can comprise a value between 0 and 1, inclusive, where zero represents a fully alert mental state and 1 indicates a fully impaired mental state. In this scenario, a value between 0.00 and 0.25 may indicate a normal/alert state, a value between 0.25 and 0.50 may indicate a drowsy state, a value between 0.50 and 0.75 may indicate a tired state and a value between 0.75 and 1.00 may indicate an impaired state.

In an alternative embodiment, the output of block 102 may comprise a categorical value. Thus, instead of a continuous range of values, the output of block 102 may comprise a symbol indicating the state of the user, without further detail.

In block 104, the method loads black box settings for the user's current mental state. In one embodiment, the settings include at least one setting an operational characteristic of a black box installed in the automobile.

In one embodiment, the settings comprise a file specifying how the black box operates. In other embodiments, the settings comprise a set of commands (e.g., a script) used to configure the parameters of the black box. In one embodiment, the settings are mapped to a mental state. Thus, a first set of settings exist for a "drowsy" state, a second set of settings exist for a "tired" state, and a third set of settings exist for an "impaired" state. In some embodiments, settings for a normal or alert state may comprise resetting the black box operating parameters or may comprise a fourth set of settings. In this embodiment, the method loads the settings from disk based on the identified state.

In another embodiment, the settings can comprise functional definitions. That is, the settings may comprise a function of a given state. This embodiment may be used when the output of block 102 is a continuous value. As one example, a black box setting may comprise an amount of time that the black box records for (e.g., specified in minutes). In this embodiment, a continuous value representing the mental state can be used to scale the default value (e.g., 2 minutes). As one example, the continuous value between 0 and 1 can be used to increase the recording interval by 0% to 100%. Other formulae may be used as well.

In some embodiments, the two example embodiments can be combined. In this embodiment, the method may use the continuous value to identify the state and load a set of commands or settings to adjust. The method may then specify the adjustments using the actual continuous values. Thus, continuing the previous example provided in block 102, if the value of the mental state is 0.30, the method may classify this state as drowsy (e.g., between 0.25 and 0.50) and load a set of drowsy settings or commands. The method may then use the value (0.3) to modify the settings (e.g., increasing the window length by 30%).

In block 106, the method reconfigures the black box using the loaded settings.

After block 104, the method obtains a set of instructions or settings. The method then uses these settings to modify the operations of the black box. In one embodiment, the reconfiguring is dependent on the interface provided by the black box. In one embodiment, the method transmits a set of settings to the black box. The black box then processes the settings and updates its operation. In another embodiment, the method can transmit individual commands to the black box to update the operation of the black box. In essence, the distinction between the two is between batch or streaming configuration.

In some embodiments, the method may transmit settings that are not supported by the black box. Alternatively, or in conjunction with the foregoing, the method may transmit values for settings that are not supported by the black box. In the former case, the black box will ignore the setting and (optionally) issue a message indicating that the setting is not supported. In this scenario, the method may load a backup setting based on receiving the message. In the latter, the method may reconfigure the setting value to a value supported by the black box. For example, if the black box has a maximum recording window of twenty minutes and the requested value as thirty minutes, the method may step down the value to twenty minutes based on the black box identifying the setting of thirty minutes as unsupported.

In block 108, the method operates the black box. In one embodiment, operating the black box comprises recording events using the black box based on the settings.

In some embodiments, the black box may operate according to its embedded firmware or software. The specific details of the black box operation are not described herein and may vary based on the type of black box used. However, as indicated above, the black box's operations will be adjusted based on the underlying settings. In general, a black box records data to a storage device. Thus, the settings modify precisely how and when this recording will take place. The underlying recording process is not described herein for the sake of brevity.

In block 110, the method determines whether a collision has occurred.

In general, a vehicle can detect a collision via one or more sensors in the automobile that are responsive to collisions. These sensors transmit a notification over an internal bus that indicates the collision occurs. The method is configured to detect when this signal is transmitted. The specific details of black box operations post-collision are not described herein and any operations needed to be performed by the black box (e.g., reporting of its storage medium) can be performed.

In block 112, the method executes a post-collision procedure upon detecting that a collision has occurred.

Once a collision is detected, the method performs various actions unrelated to the operations of the black box (omitted above). Specifically, the actions performed in block 112 are intended to fine-tune the system. In one embodiment, the method can upload the black box data to a separate system that manages the mental state evaluation software. In this manner, the method can either confirm or refute the proper classification of mental states based on the above-described data. Additionally, the raw data can be used to identify new patterns that indicate mental states.

In some embodiments, the method will update a local state machine unique for the user. Certainly, users may vary slightly in when they are tried, drowsy, or impaired. Thus, if the method determines that a state was labeled as drowsy before a collision the method may adjust the state transitions to increase the likelihood that a user is tired given the same conditions.

In block 114, the method determines if a refresh is needed upon detecting that a collision has not occurred.

In the illustrated embodiment, block 112 is only performed upon a collision. In contrast, block 114 is performed more frequently when a collision has not occurred. In block 114, the method continuously adjusts the user's mental state.

In one embodiment, the method utilizes a fixed timer to determine when to re-analyze the user's mental state. Thus, in this embodiment, the method may re-evaluate the user's mental state every fifteen minutes. The specific interval used is not limiting.

In contrast, the method may use other techniques to determine whether a refresh is needed. In one embodiment, the method can use the storage capacity of an event storage device (discussed in FIG. 2) to determine when enough events have been detected that merit a refresh. Alternatively, the method may refresh on every detected event.

Although not illustrated, the method operates during the entire running time of the vehicle. Thus, the method continuously operates until a collision occurs or until the vehicle is turned off.

Figure 2:
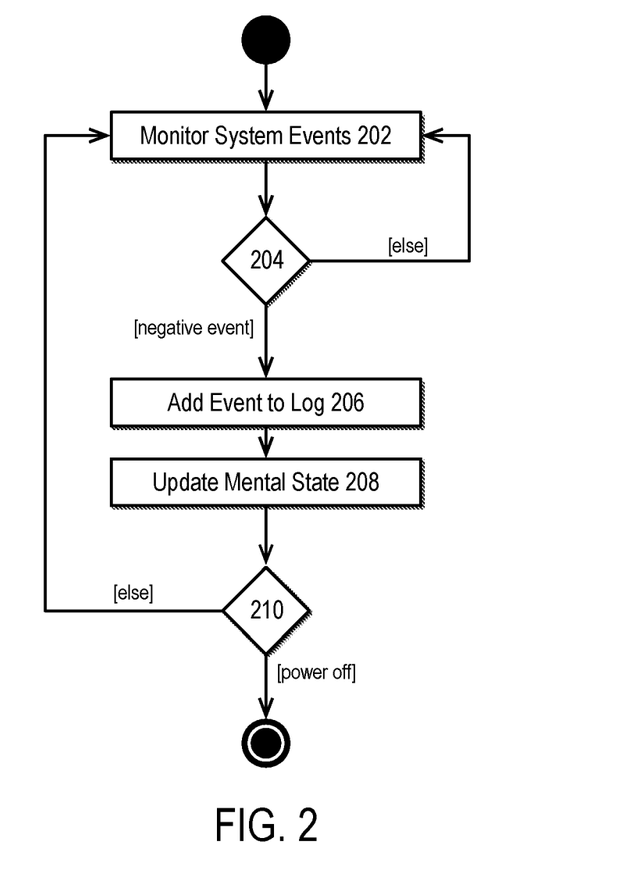
FIG. 2 is a flow diagram illustrating a method for updating a user's mental state based on vehicular events according to some embodiments of the disclosure.

FIG. 2 is a flow diagram illustrating a method for updating a user's mental state based on vehicular events according to some embodiments of the disclosure.

In block 202, the method monitors system events.

In one embodiment, the method monitors events broadcast on a vehicle bus (e.g., a controller area network bus). Various subsystems (depicted in FIG. 5) issue these events in response to the operation of a vehicle. Exemplary events include events such as brake pedal depression, gas pedal depression, instantaneous speed, velocity or acceleration; activation of turn signal, turning of wheels, and other events.

In block 204, the method determines if a negative event is present in the system events.

In one embodiment, the method determines if a negative event occurs by determining if the event is anomalous. Various techniques may be used to determine if an event is anomalous. For example, if the data is time series data (e.g., speed measurements), a moving average or autoregressive integrated moving average (ARIMA) model may be used to detect anomalous changes in such data. Thus, if a user rapidly accelerates, this event may be flagged as a negative event.

In some embodiments, multiple closely-occurring data points may be combined to determine a negative event. For example, the method may correlate the use of a turn signal and a severe turning of front wheels to determine that a user made a turn without signaling. In general, these data points comprise a lack of a turn signal data point combined with a turn radius value exceeding a given threshold (e.g., forty-five degrees). The method may detect the turn radius value and attempt to determine if a turn signal event was also received. If not, the method synthesizes a negative event (e.g., an "illegal turn" event).

In some embodiments, the method may use data from other systems to generate negative events. For example, if the user is utilizing a global positioning system (GPS) device and the user does not heed the directions, the method may flag this deviation as a negative event. As another example, the method may use Lidar measurements to determine that a user is tailgating another user and may flag this as a negative event. As another example, the method may use data from advanced driver-assistance system (ADAS) devices to generate negative events. For example, an ADAS device may issue an event that indicates a user has crossed a road marking. The method may detect this event and flag it as negative. Similarly, an ADAS device may issue an event indicating that collision avoidance (either pedestrian, vehicular, or other) was taken and the method may flag this event as negative.

The foregoing examples are intended to illustrate various types of event detection techniques and is not intended to be limiting. Other types of data may be analyzed to detect negative events and such types of data and processing should be considered as falling within the scope of block 204.

In block 206, the method adds the negative event to a log of negative events upon determining that a negative event occurred.

In one embodiment, block 206 comprises storing the data used to detect the event in a dedicated storage device. In one embodiment, the storage device can be implemented as a circular buffer or other type of buffer. In some embodiments, the storage device can comprise a persistent storage device used for post-collision analysis or to improve the event detection algorithms.

In block 208, the method updates the mental state of a user based on the newly identified negative event.

In some embodiments, a user's mental state can be implemented as a state machine. In this embodiment (discussed in more detail in FIG. 3), the contents of the event log are used to transition between states. Thus, in some embodiments, the method updates a mental state each time an event is written to the log. In other embodiments, the method only updates a user's mental state when a sufficient number of events are stored in the log, reducing processing requirements.

In an alternative embodiment (not illustrated), the method may operate a separate "good" event log. In this embodiment, the method executes blocks 202, 204, and 206 to detect good events (e.g., using turn signals when turning, maintaining constant or reasonable speed, etc.). This process can be viewed as the inverse as the above-described process for negative events. If the method implements this second log, the second log can also be used to update a user's mental state in an inverse manner. That is, while accumulation of negative events transitions the user to a worse mental state, good events can transition the user to a better mental state.

In some embodiments, time may be used to transition between states. In this embodiment, a user may exhibit multiple negative events which may transition the user from a normal/alert state to a drowsy state. However, after sufficient time has elapsed with no negative events, the method may transition the user back to a normal/alert state. Thus, the method can course-correct for temporary negative events (e.g., distracted driving).

In block 210, the method determines if the device is still operating. If so, the method continues to re-execute blocks 202, 204, 206, and 208 until the device is powered off. In some embodiments, block 210 may also include determining if a collision occurred and ending processing upon detecting a collision.

Figure 3:
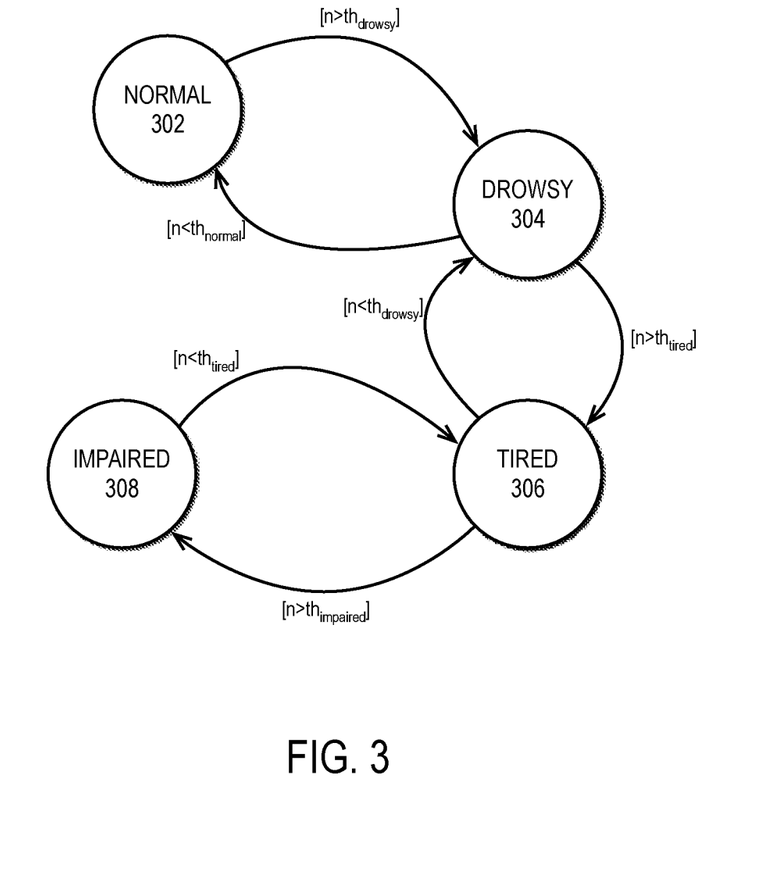
FIG. 3 is a state diagram illustrating a method for transitioning between user mental states based on vehicular events according to some embodiments of the disclosure.

FIG. 3 is a state diagram illustrating a method for transitioning between user mental states based on vehicular events according to some embodiments of the disclosure.

In the illustrated embodiment, four states are illustrated: normal (302), drowsy (304), tired (306), and impaired (308). These states are illustrative and more or fewer states may be implemented. As illustrated, these states are connected via state transition rules. A user is always in one of the illustrated states, the current state dependent on the underlying analyzed events.

In the illustrated embodiment, a user starts in a normal state (302). This state (302) is also referred to as an alert state. In this state (302), the black box is configured to operate according to a set of default settings.

As the user operates a vehicle, one or more negative events may be detected and stored in a negative event storage log (discussed in FIG. 2). The system may be configured with a first threshold ($th_{drowsy}$) that comprises a fixed number of negative events that trigger a state change. Once the number of events (n) in the log exceeds thdrowsy, the state is changed to drowsy (304).

In one embodiment, the number of events (n) is calculated based on the size of the log. In other embodiments, the number of events (n) is stored in a separate register and maintained despite the flushing of the log.

Similar techniques enable the changing of state from drowsy (304) to tired (306) and ultimately to impaired (308). Specifically, the system includes two thresholds ($th_{tired}$ and $th_{impaired}$) that trigger transitions to the tired (306) and impaired (308) states, respectively. In the illustrated embodiment, $th_{impaired} > th_{tired} > th_{drowsy}$.

As illustrated, reverse state changes allow for the transitioning from impaired (308) to tired (306) to drowsy (304) and ultimately to normal (302). These transitions can be performed by reversing the comparisons of the number of events (n) to the corresponding thresholds.

In one embodiment, the number of events (n) can be decremented based on the detection of a "good" event, as described in FIG. 2. Thus, for every good event, the number of events (n) is decremented by one, resulting in potential state changes. Alternatively, or in conjunction with the foregoing, the number of events (n) can be decremented based on a decay function. In one embodiment, the decay function as a form of $e^{\beta t}$, where β is a fixed parameter defining the decay over time and t represents time. In some embodiments, each state may have its own value of β. Thus, a value $\beta_{impaired}$ may be set higher than $\beta_{tired}$ due to the severity of the state. In general, the decay function will slowly reduce the value of n and thus trigger state changes.

Figure 4:
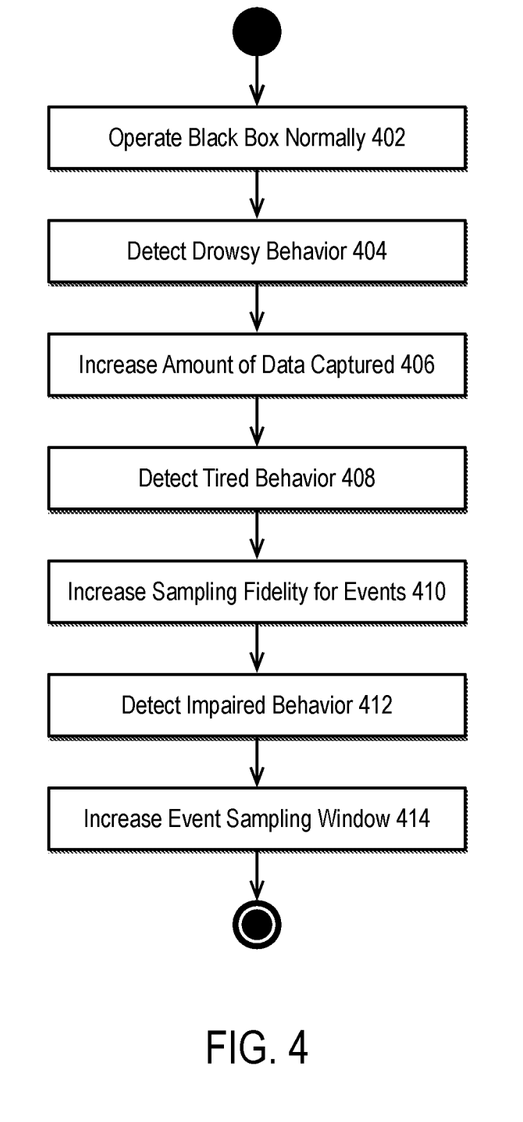
FIG. 4 is a flow diagram illustrating a method for incrementally modifying the operations of a vehicle's black box based on mental state changes of a user according to some embodiments of the disclosure.

FIG. 4 is a flow diagram illustrating a method for incrementally modifying the operations of a vehicle's black box based on mental state changes of a user according to some embodiments of the disclosure. The illustrated embodiment provides one example of combining the above teachings. Other combinations may be implemented and the following description is not intended to limit the overall operation of the foregoing methods.

In block 402, the method operates a black box normally. As described above, this may entail recording event data according to a set of default configuration parameters.

In block 404, the method detects drowsy behavior. In one embodiment, the method may detect that the user has begun to erratically increase and decrease speed. The method detects this by analyzing time-series speed data to detect anomalous changes from an average speed. In one embodiment, an ARIMA model is used to detect these changes. The method then writes events to a log indicating a negative event (erratic speed changes) has occurred. Once a sufficient number of these events (or other events) have occurred, the method transitions the user's mental state to drowsy.

In block 406, the method increases the amount of data captured by the black box.

The specific change in block 406 is not limiting. In the illustrated embodiment, the method transmits an instruction or setting to the black box to indicate that the amount of data (in bytes) should be expanded from a default value. This ensures that more data is recorded before being overwritten. In the illustrated embodiment, this specific setting may be selected based on a trade off between increasing the processing and storage requirements of the black box and the risks of a drowsy state.

In block 408, the method detects tired behavior. In the illustrated embodiment, the method continues to record negative events and detects a tired behavior when the number of events exceeds a second threshold.

In block 410, the method increases the sampling fidelity of the black box.

The specific change in block 410 is not limiting. In the illustrated embodiment, once a user transitions to a tired state, the method may increase the processing burden on the black box since the tired state indicates an increased risk of collision. In one embodiment, the sampling fidelity comprises how much data of an event is captured by the black box. For example, in a default operating mode the black box may simply indicate the presence of an event but may discard the underlying data of the event. In block 410, the method instructs the black box to capture more data than simply presence of an event, thus ensuring that a full picture of events can be reconstructed in the event of a collision.

In block 412, the method detects impaired behavior. In the illustrated embodiment, the method continues to record negative events and detects an impaired behavior when the number of events exceeds a third threshold.

In block 414, the method increases the event sampling window.

The specific change in block 414 is not limiting. In the illustrated embodiment, once a user transitions to an impaired state, the method may increase the event sampling window. In this embodiment, the method increases the amount of time the black box records data for from a default value (e.g., two minutes to ten minutes).

In the illustrated embodiment, the various changes in operating parameters of the black box may be cumulative. That is, blocks 406, 410, and 414 may progressively add additional burdens on the black box that are commensurate with the detected state.

Figure 5:
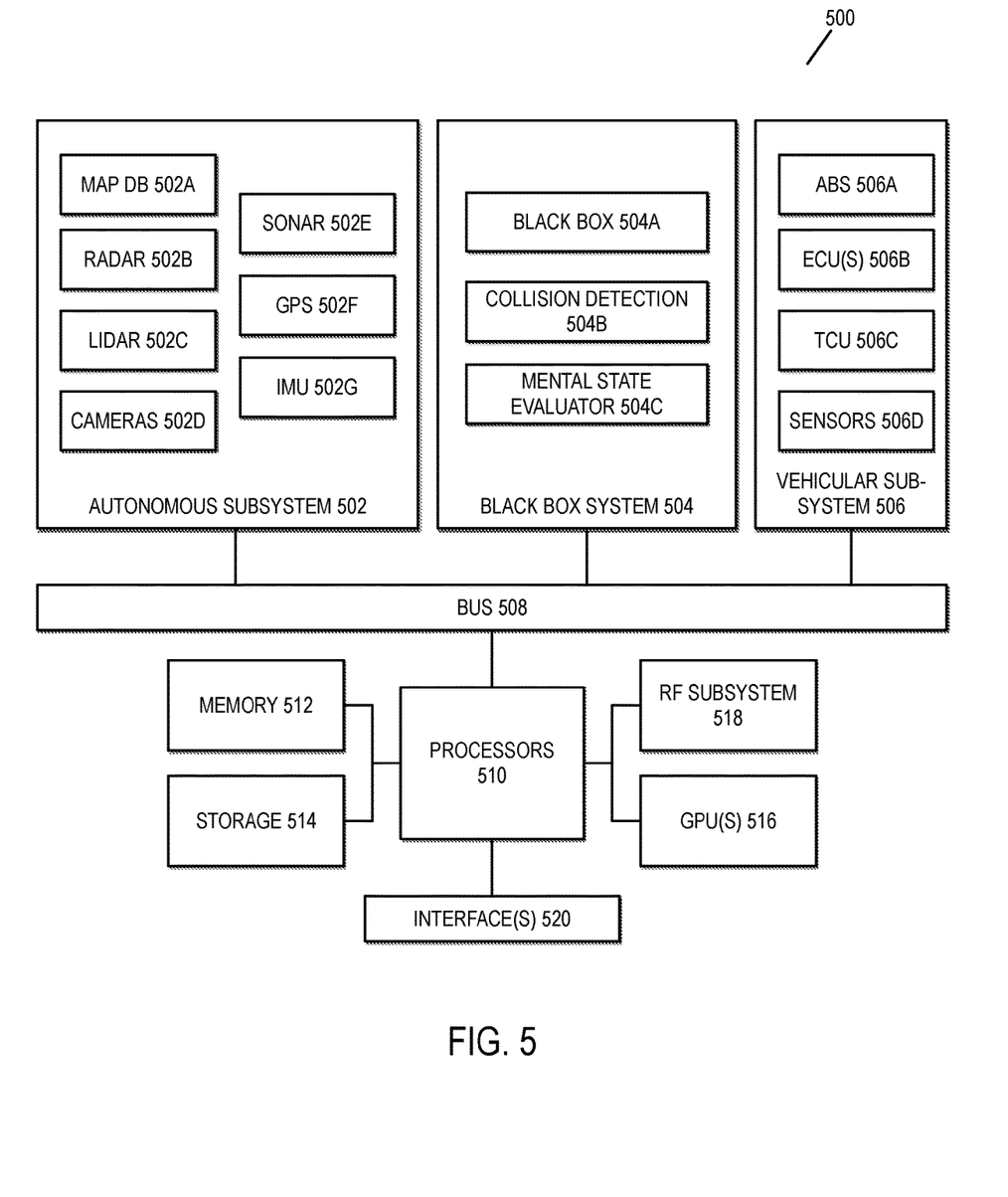
FIG. 5 is a block diagram illustrating a vehicular computing system according to some embodiments of the disclosure.

FIG. 5 is a block diagram illustrating a vehicular computing system according to some embodiments of the disclosure.

The system illustrated in FIG. 5 may be installed entirely within a vehicle. In some embodiments, some components (e.g., components and subsystems other than subsystem (504)) may comprise existing autonomous and non-autonomous vehicle subsystems.

The system optionally includes an optional autonomous vehicle subsystem (502). In the illustrated embodiment, autonomous vehicle subsystem (502) includes map database (502a), radar devices (502b), Lidar devices (502c), digital cameras (502d), sonar devices (502e), GPS receivers (502f), and inertial measurement units (502g). Each of the components of an autonomous vehicle subsystem (502) comprise standard components provided in most current autonomous vehicles. In one embodiment, map database (502a) stores a plurality of high-definition three-dimensional maps used for routing and navigation. Radar devices (502b), Lidar devices (502c), digital cameras (502d), sonar devices (502e), GPS receivers (502f), and inertial measurement units (502g) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality. In some embodiments the autonomous subsystem (502) is built into the vehicle while in other embodiments the autonomous subsystem (502) comprises an aftermarket system.

Vehicular subsystem (506) is additionally included within the system. Vehicular subsystem (506) includes various anti-lock braking systems (506a), engine control units (506b), and transmission control units (506c). These components may be utilized to control the operation of the vehicle in response to the data generated by autonomous vehicle subsystem (502) and/or black box subsystem (504). The standard autonomous vehicle interactions between autonomous vehicle subsystem (502) and vehicular subsystem (506) are generally known in the art and are not described in detail herein.

The processing side of the system includes one or more processors (510), short-term memory (512), an RF system (518), graphics processing units (GPUs) (516), long-term storage (514) and one or more interfaces (520).

The one or more processors (510) may comprise central processing units, FPGAs, or any range of processing devices needed to support the operations of the autonomous vehicle. Memory (512) comprises DRAM or other suitable volatile RAM for temporary storage of data required by processors (510). RF system (518) may comprise a cellular transceiver and/or satellite transceiver. Long-term storage (514) may comprise one or more high-capacity solid-state drives (SSDs). In general, long-term storage (514) may be utilized to store, for example, high-definition maps, routing data, and any other data requiring permanent or semi-permanent storage. GPUs (516) may comprise one more high throughput GPU devices for processing data received from autonomous vehicle subsystem (502). Finally, interfaces (520) may comprise various display units positioned within the autonomous vehicle (e.g., an in-dash screen).

The system additionally includes a black box subsystem (504) which performs the operations required by the methods illustrated in the preceding Figures. The black box subsystem (504) includes a black box (504a), collision detection module (504b), and mental state evaluator (504c) which perform the mental state and black box configuration algorithms.

In some embodiments, it is to be understood that the steps of methods described above can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure represents a minimal method within a possibly larger method of a computer system more complex than the ones presented in the description. Thus, the steps depicted in each figure can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, from a sensor of an automobile, one or more outputs of vehicle components generated during operation of the automobile by a driver;
storing a set of negative events detected in the one or more outputs;
classifying a mental state of the driver of the automobile by aggregating a total number of negative events in the set of negative events and comparing the total number of negative events to a plurality of thresholds;
loading at least one setting in a processor or computing device of a monitoring system in the automobile based on the mental state, the at least one setting defining an operational characteristic of memory or storage of the monitoring system in the automobile, wherein the at least one setting is selected from a plurality of settings, each setting in the plurality of settings associated with a mental state classification and at least one operational characteristic of the memory of the monitoring system, the at least one operational characteristic modifying a manner in which the monitoring system captures data recorded by the vehicle components;
configuring the monitoring system using the at least one setting; and
recording one or more events by the monitoring system.

2. The method of claim 1, the classifying the mental state of the driver comprising classifying the mental state as drowsy, tired, or impaired.

3. The method of claim 1, the loading at least one setting comprising loading a setting increasing an amount of data captured by the monitoring system.

4. The method of claim 1, the loading at least one setting comprising loading a setting increasing a sampling fidelity of the monitoring system.

5. The method of claim 1, the loading at least one setting comprising loading a setting increasing an event sampling window of the monitoring system.

6. A non-transitory computer-readable storage medium for tangibly storing computer program instructions that, when executed by a computer processor, cause the computer processor to perform operations of:
receiving, from a sensor of an automobile, one or more outputs of vehicle components generated during operation of the automobile by a driver;
storing a set of negative events detected in the one or more outputs;
classifying a mental state of the driver of the automobile by aggregating a total number of negative events in the set of negative events and comparing the total number of negative events to a plurality of thresholds;
loading at least one setting in the computer processor or computing device of a monitoring system in the automobile based on the mental state, the at least one setting defining an operational characteristic of a memory or storage of the monitoring system in the automobile, wherein the at least one setting is selected from a plurality of settings, each setting in the plurality of settings associated with a mental state classification and at least one operational characteristic of the memory of the monitoring system, the at least one operational characteristic modifying a manner in which the monitoring system captures data recorded by the vehicle components;
configuring the monitoring system using the at least one setting; and
recording one or more events by the monitoring system.

7. The non-transitory computer-readable storage medium of claim 6, the classifying the mental state of the driver comprising classifying the mental state as drowsy, tired, or impaired.

8. The non-transitory computer-readable storage medium of claim 6, the loading at least one setting comprising loading a setting increasing an amount of data captured by the monitoring system.

9. The non-transitory computer-readable storage medium of claim 6, the loading at least one setting comprising loading a setting increasing a sampling fidelity of the monitoring system.

10. The non-transitory computer-readable storage medium of claim 6, the loading at least one setting comprising loading a setting increasing an event sampling window of the monitoring system.

11. An apparatus comprising:
a processor; and
a storage medium for tangibly storing thereon program logic for execution by the processor, the stored program logic causing the processor to perform operations of:
receiving, from a sensor of an automobile, one or more outputs of vehicle components generated during operation of the automobile by a driver;
storing a set of negative events detected in the one or more outputs;
classifying a mental state of the driver of the automobile by aggregating a total number of negative events in the set of negative events and comparing the total number of negative events to a plurality of thresholds;
loading at least one setting in a processor or computing device of a monitoring system in the automobile based on the mental state, the at least one setting defining an operational characteristic of a memory or storage of the monitoring system in the automobile, wherein the at least one setting is selected from a plurality of settings, each setting in the plurality of settings associated with a mental state classification and at least one operational characteristic of the memory of the monitoring system, the at least one operational characteristic modifying a manner in which the monitoring system captures data recorded by the vehicle components;
configuring the monitoring system using the at least one setting; and
recording one or more events by the monitoring system.

12. The apparatus of claim 11, the classifying the mental state of the driver comprising classifying the mental state as drowsy, tired, or impaired.

13. The apparatus of claim 11, the loading at least one setting comprising loading a setting increasing an amount of data captured by the monitoring system.

14. The apparatus of claim 11, the loading at least one setting comprising loading a setting increasing a sampling fidelity of the monitoring system.

15. The apparatus of claim 11, the loading at least one setting comprising loading a setting increasing an event sampling window of the monitoring system.

* * * * *